United States Patent
Semak

(10) Patent No.: US 7,173,212 B1
(45) Date of Patent: Feb. 6, 2007

(54) METHOD AND APPARATUS FOR LASER CUTTING AND DRILLING OF SEMICONDUCTOR MATERIALS AND GLASS

(76) Inventor: Vladimir V. Semak, P.O. Box 11, Pine Grove Mills, PA (US) 16868

( * ) Notice: Subject to any disclaimer, the term of this patent is extended or adjusted under 35 U.S.C. 154(b) by 0 days.

(21) Appl. No.: 11/057,109

(22) Filed: Feb. 11, 2005

Related U.S. Application Data

(60) Provisional application No. 60/544,710, filed on Feb. 13, 2004.

(51) Int. Cl.
*B23K 26/38* (2006.01)
(52) U.S. Cl. .............. 219/121.69; 219/121.61; 219/121.71
(58) Field of Classification Search .......... 219/121.61, 219/121.68, 121.69, 121.72, 121.76, 121.62, 219/121.64, 121.66, 121.67, 121.77
See application file for complete search history.

(56) References Cited

U.S. PATENT DOCUMENTS

| | | | |
|---|---|---|---|
| 4,870,244 A * | 9/1989 | Copley et al. ......... | 219/121.61 |
| 5,300,756 A * | 4/1994 | Cordingley ............ | 219/121.69 |
| 5,922,224 A | 7/1999 | Broekroelofs | |
| 6,552,301 B2 | 4/2003 | Herman et al. | |
| 6,574,250 B2 * | 6/2003 | Sun et al. .............. | 219/121.69 |
| 6,664,498 B2 | 12/2003 | Forsman et al. | |
| 6,717,104 B2 | 4/2004 | Thompson, Jr. et al. | |
| 6,784,400 B1 | 8/2004 | Banks et al. | |
| 2005/0067388 A1 * | 3/2005 | Sun et al. .............. | 219/121.61 |
| 2005/0218122 A1 * | 10/2005 | Yamamoto et al. .... | 219/121.61 |

\* cited by examiner

*Primary Examiner*—Geoffrey S. Evans
(74) *Attorney, Agent, or Firm*—Stout, Uxa, Buyan & Mullins, LLP; Donald E. Stout

(57) ABSTRACT

A method for laser drilling and laser cutting of semiconductor material or glass in pulsed regime permits, for a given laser power, a rate of material cutting which is substantially higher than the rate obtained using conventional laser cutting. The hole or cut produced by the laser-induced removal of material has a reproducible shape, the drilling or cutting does not produce material debris or spatter deposition around the crater or cut, and the cracking of the crater or cut walls is prevented. The method includes utilization of a unique physical model representing all main physical processes taking place during laser-assisted material deposition, a corresponding mathematical model consisting of equations describing the relevant physical processes, and a computer code used for numerical calculations of the parameters of interest according to the mathematical model.

9 Claims, 7 Drawing Sheets

METHOD AND APPARATUS FOR LASER CUTTING AND DRILLING OF SEMICONDUCTOR MATERIALS AND GLASS

This application claims the benefit under 35 U.S.C. 119(e) of the filing date of Provisional U.S. Application Ser. No. 60/544,710, entitled Method and Apparatus for Laser Cutting and Drilling of Semiconductor Materials, and filed on Feb. 13, 2004, which application is expressly incorporated herein by reference.

BACKGROUND OF THE INVENTION

The present invention relates generally to the field of laser materials processing, and more particularly to technologies related to laser cutting and drilling of semiconductor materials and glass.

Semiconductor Wafer Dicing

Presently, the thickness of the most widely used semiconductor wafers exceeds 200 micrometers. Such thick wafers can be diced using mechanical methods. There are three prevalent methods for mechanical dicing of the semiconductor wafer: diamond saw cutting, scribing and cleaving, and laser cutting. Currently, the majority of wafers are cut using a diamond saw. Scribing and cleaving is utilized only in small volume production, and mainly for diode manufacturing. Laser cutting has not yet been implemented, to the knowledge of the inventor, in any industrial application.

During the process of diamond saw cutting, multiple cracks are always produced in the wafer. The cracks must be removed by chemical etching. This technological step increases the cost of semiconductor chip manufacturing, and has a significant effect on the environment. The rate of diamond saw cutting is proportional to the semiconductor wafer thickness, and cutting of wafers thinner than 50 micrometers is impossible using a diamond saw.

Scribing and cleaving of semiconductor wafers, similar to diamond saw dicing, can be used only for thick wafers. Additionally, cleaving produces a certain amount of scrap due to chipping of the edges of the cleaved wafer, which increases production cost.

The evolution of semiconductor chip manufacturing requires the thickness of the chips to be decreased below 100 micrometers in order to satisfy demands for miniaturization, reduced thermal resistivity providing more effective cooling, reduction of thermal stress effect, and improvement of electrical performance. Therefore, a significant interest has been generated in laser machining technology, which provides contactless cutting and, therefore, can be applied for the dicing of very thin wafers. However, the efforts to implement laser cutting methods thus far have been daunting. In spite of multiple attempts conducted within the industry, beginning with the invention of commercial lasers in the 1960's, the laser machining of semiconductors and glass remains unimplemented in industry. The main challenges are: 1) the high cost of dicing due to the high cost of laser systems and slow laser cutting rates, 2) micro-cracking because of thermal stress induced in the workpiece as a result of the absorption of laser beam energy, and 3) contamination of the surface of the material being cut with melt droplets, due to melt sputtering, which fuse to the substrate material.

Glass Cutting

Presently, the cutting of glass is performed using two state of the art methods. The first of these methods requires mechanical scribing of the glass along a desired cutting line, and subsequent breaking of the glass along the scribe line. The second method is to induce a crack along a desired cutting line on the glass using a laser beam, and then breaking the glass along this crack. The first method is less expensive but produces powder debris during the scribing step. The largest market utilizing glass cutting is flat panel display manufacturing, which is intolerant of the generation of debris. Thus, the second laser cutting method is more promising. Unfortunately, current laser induced thermal cracking cutting methods as described above are applicable only to produce straight cuts or cuts with a large radius of curvature.

SUMMARY OF THE INVENTION

The present invention addresses the above noted shortcomings of the prior art by providing a method for laser drilling and laser cutting of semiconductor material or glass in pulsed regime, by which, for a given laser power the rate of material cutting is substantially higher than the rate obtained using conventional laser cutting. The hole or cut produced by the laser-induced removal of material has a reproducible shape, the drilling or cutting does not produce material debris or spatter deposition around the crater or cut, and the cracking of the crater or cut walls is prevented. The inventive method includes utilization of a unique physical model representing all main physical processes taking place during laser-assisted material deposition, a corresponding mathematical model consisting of equations describing the relevant physical processes, and a computer code used for numerical calculations of the parameters of interest according to the mathematical model.

Advantages of the present invention include, but are not limited to, the following:

1) Elimination of micro-cracking, melt spattering, and melt recast formation;
2) Elimination of post process etching;
3) Ability to cut wafers with thickness substantially below 100 micrometers;
4) Reduction in manufacturing time;
5) Substantially increased cutting rate;
6) Ability to perform cutting along a curve with a substantially smaller radius of curvature; and
7) Less waste of semiconductor or glass material.

More particularly, in one aspect of the invention, a method is provided for modifying a material surface using one or more lasers, which comprises a first step of applying a laser pulse to a desired laser beam interaction zone on the material surface for a predetermined period $t_1$ at a predetermined power level $P_1$ such that processed material melts and evaporates producing evaporation induced recoil which displaces produced melt to a periphery of the interaction zone without substantial ejection of molten material from the laser beam interaction zone, thereby creating a keyhole in the material. Then, a laser pulse is applied to the laser beam interaction zone for a predetermined period $t_2$ at a different predetermined power level $P_2$ such that the induced evaporation recoil is insufficient to counteract surface tension pressure, and a controlled collapse of said keyhole occurs while maintaining a temperature of produced melt above a melting temperature of the material. Third, a laser pulse is applied to the laser beam interaction zone for a predetermined period $t_3$ at a different predetermined power level $P_3$, such that rapid evaporation of the molten material is induced, generating recoil which produces near complete ejection of the melt created during the first period to, and thus forms a crater. Finally, a laser pulse is applied to the laser beam interaction zone for a predetermined period $t_4$ at a different predetermined power level $P_4$, such that a temperature of the remaining melt which was not ejected from the interaction zone and a temperature of the solid material near a wall of said crater decrease at a controlled rate which is below a cooling rate which would ordinarily produced microcracking of the material.

In another aspect of the invention, there is provided an apparatus for modifying a material surface such as a semiconductor material or glass, which comprises a laser system capable of generating laser pulses having varying power levels over predetermined sequential periods of time, as well as a pulse generator for controlling the laser system. At least one mirror is positioned for redirecting a laser beam from the laser system, and a focusing lens is disposed for focusing the laser beam onto the material surface.

In yet another aspect of the invention, an apparatus is provided for modifying a material surface such as a semiconductor material or glass, which comprises a plurality of laser systems for sequentially generating laser pulses having varying power levels over predetermined periods of time. A multichannel delayed pulse generator is provided for sequentially controlling each of the laser systems in a coordinated manner in order to apply sequential laser pulses of desired power levels and duration to the material surface.

The invention, together with additional features and advantages thereof, may best be understood by reference to the following description taken in conjunction with the accompanying illustrative drawing.

DESCRIPTION OF THE PREFERRED EMBODIMENT

A preferred embodiment of the present invention comprises two phases. A first phase involves defining the required laser pulse shape and pulse energy via simulation of the laser induced melting of material, keyhole formation, melt ejection, and controlled cooling of the wall of the crater or cut. A second phase includes configuring a laser or lasers in order to produce a numerically predicted pulse shape, beam intensity distribution and pulse energy, and performing drilling or cutting of the material with the predicted laser parameters.

Figure 1A:
FIG. 1a is a schematic graphical view of a typical prior art laser pulse in the millisecond range used for drilling and cutting.
Figure 1B:
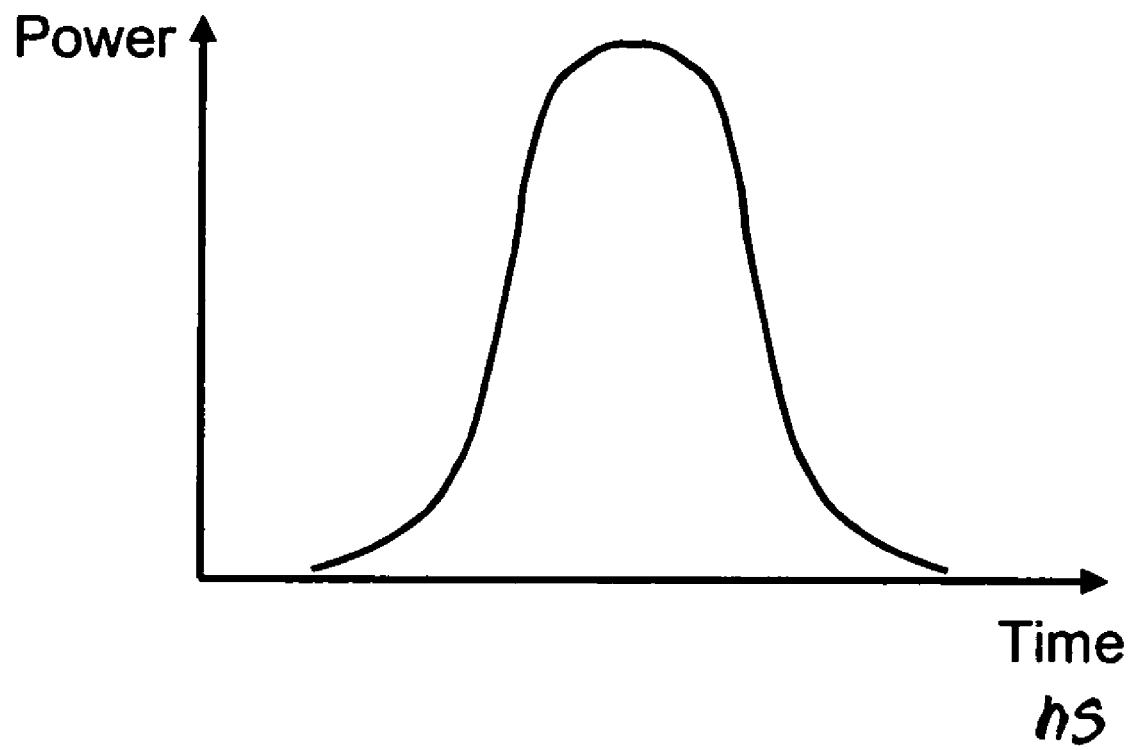
FIG. 1b is a schematic graphical view of a typical prior art laser pulse in the nanosecond range used for drilling and cutting.
Figure 1:
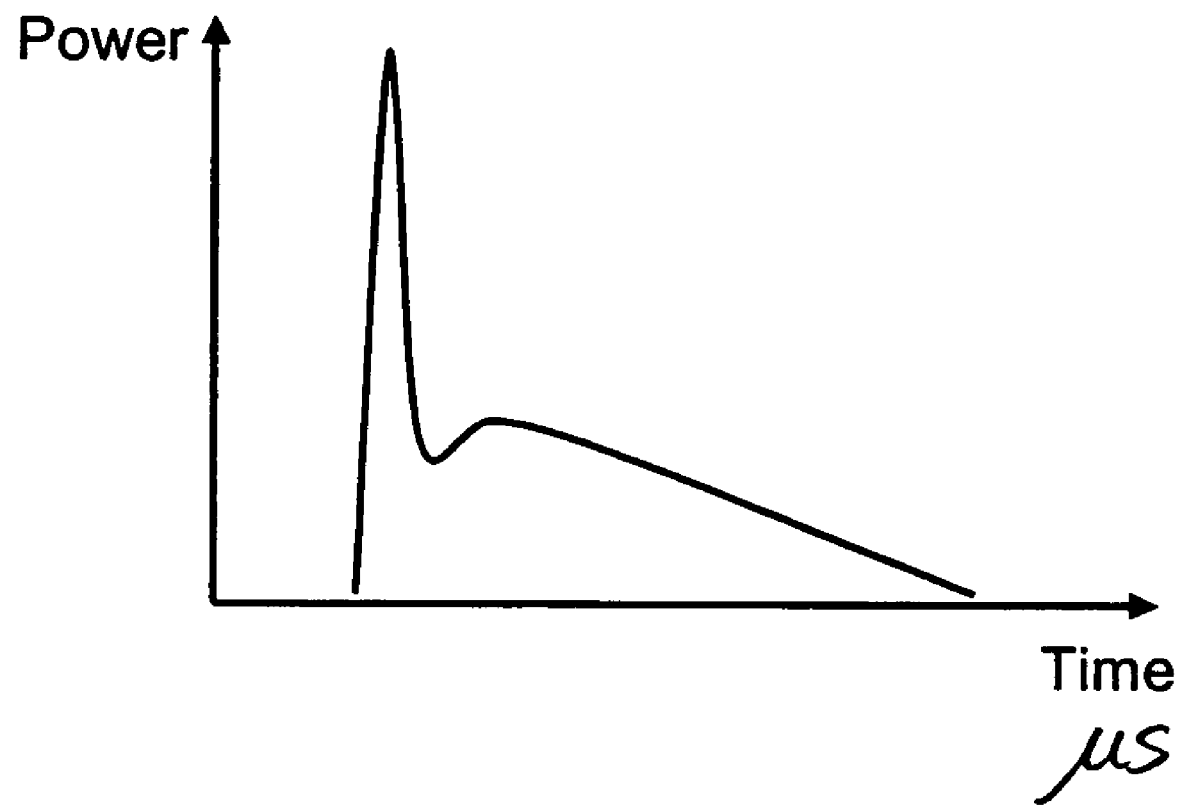
FIG. 1c is a schematic graphical view of a typical prior art laser pulse in the microsecond range used for drilling and cutting.

The invention is based on the following theoretical considerations. Typically, the shape of a laser pulse used for drilling and cutting is as shown in prior art FIGS. 1a, 1b, and 1c. As illustrated, the power of the laser beam increases rapidly, such that melting of the material surface and material ejection occur at the leading front of the pulse. The drilling or cutting occurs during the rest of the laser pulse by the ejection of the molten material, which is produced due to the propagation of the melt boundary into the material bulk. Thus, in typical drilling or cutting, the material is ejected as soon as it is melted. It is known that melt ejection is unstable, in that the melt ejection velocity fluctuates. Therefore, the drilling or cutting results in an irreproducible hole or crater shape. The fluctuations of melt ejection velocity results in the spattering of material when the melt velocity decreases, and surface tension is capable of retaining a portion of the melt around the crater or cut. The simultaneous melt production and melt ejection, accompanied by instabilities of the melt flow, are inefficient because the power of the laser must be high during the entire duration of the laser pulse to ensure constant (during the laser pulse) ejection of melt. Finally, during the described laser drilling or cutting, the temporal evolution of the thermal gradient induced in the material is uncontrollable. Thus, in case of drilling or cutting of a brittle material, thermal cracking will occur.

The separation in time of melt production and melt ejection is incorporated into the present invention in order to avoid the above described melt flow instability and to increase the efficiency of drilling defined as the mass of material removed per unit energy of the laser pulse. The separation in time of production of melt and ejection of melt, as well as control over the thermal gradient induced in the material is achieved with the unique and advantageous laser pulse shape illustrated in FIG. 2.

Figure 2:
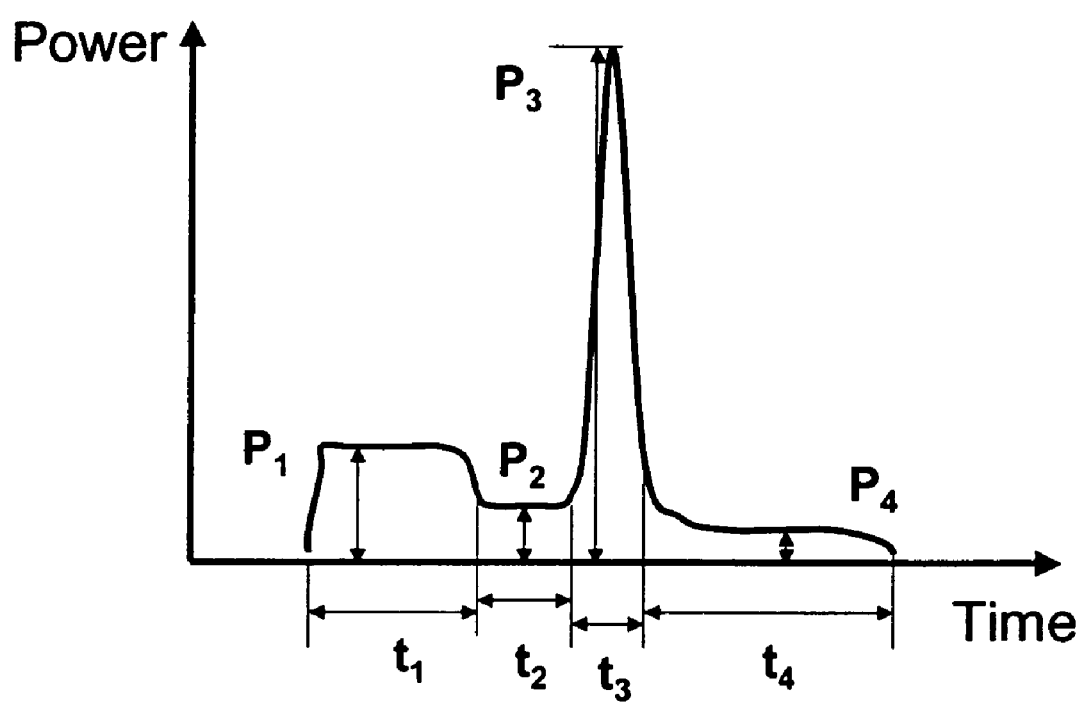
FIG. 2 is a schematic graphical view of a laser pulse shape for an increased drilling/cutting rate, crater/cut reproducibility, no spatter formation, and controlled thermal gradient during a cooling stage, in accordance with the present invention.

Referring now more particularly to FIG. 2, a first part of the illustrated laser pulse has a duration $t_1$ and an average power $P_1$, such that keyhole welding occurs during this portion of the pulse. The keyhole welding which occurs creates a deep melt pool without ejection of the melt from the laser beam interaction zone on the workpiece. A second part of the laser pulse has a duration $t_2$, and an average power $P_2$, and allows a controlled collapse of the keyhole because it has a lower power level, and the laser induced evaporation recoil is insufficient to counteract surface tension pressure which closes the keyhole. Simultaneously, the average laser power $P_2$ during the second time interval $t_2$ is such that it heats the melt pool and prevents re-solidification of the melt. Thus, at the end of the second part of the pulse, a deep melt pool is produced with the flat surface of the melt.

Next, a third part of the pulse is applied to the melt pool. The third part of the pulse has a relatively short duration $t_3$ and a relatively high average power level $P_3$. During this part of the pulse, the intense evaporation is induced and a high recoil force ejects all melt with high velocity out of the interaction zone. The velocity of the melt is high enough to overcome surface tension effect at the edge of the melt pool, and, therefore, no spattering occurs.

A fourth part of the laser pulse has a duration $t_4$, and a power level which is constantly decreasing during the interval $t_4$ down to zero. The average power level during this pulse interval is identified as $P_4$. The fourth part of the pulse has a dual purpose. First, it maintains temperature of the melt which was attained during the third part of the laser pulse, above the melting point, and prevents re-solidification of this melt as it leaves the crater. Second, after the melt is completely ejected from the crater, the walls of the crater are heated with the laser beam, allowing slow cooling of the crater walls in order to avoid producing high thermal gradients. This prevents brittle material, such as silicon, for example, from cracking. The power level during the fourth part of the laser pulse is insufficient to produce additional melting of the walls of the crater which remain after the melt produced during the first and second parts of the pulse is ejected during the third and fourth parts of the laser pulse.

The shape of the laser pulse (parameters $t_1$, $P_1$, $t_2$, $P_2$, $t_3$, $P_3$, $t_4$, $P_4$, and the rate of power decrease during the fourth part of the laser pulse) is determined via experimentation. The trial experiment is conducted as follows. First, the part of the laser pulse labeled as $t_1$ in FIG. 2 is applied to the material and the pulse energy and duration are selected such that no melt ejection is produced and the depth of the melt pool is as needed. Second, the portion of the laser pulse labeled as $t_2$ in FIG. 2 is added such that the laser pulse includes portions $t_1$ and $t_2$. The energy and duration of the portion of the pulse $t_2$ are selected such that no melt ejection is produced. Third, the portion of the pulse labeled as $t_3$ in FIG. 2 is added such that the laser pulse includes portions $t_1$, $t_2$, and $t_3$. The energy and the duration of the portion $t_3$ are selected such that all melt is ejected from the interaction zone. Finally, the portion of the pulse labeled as $t_4$ in FIG. 2 is added to the laser pulse in case of laser drilling of a material susceptible to thermal cracking, deformation, or other thermally induced defects. The energy and the duration of the portion $t_4$ are selected empirically to achieve the rate of temperature decrease which does not induce defects, as noted above. Alternatively, the selection of the parameters can be determined via simulation using the software for simulation of laser drilling and cutting which can be developed.

In a presently preferred embodiment, special attention is paid to the beam sizes and beam intensity distributions during each of the four parts of the laser pulse shown in FIG. 2. One of the possible embodiments of the beam intensity distribution dynamics is shown in FIG. 3.

Figure 3:
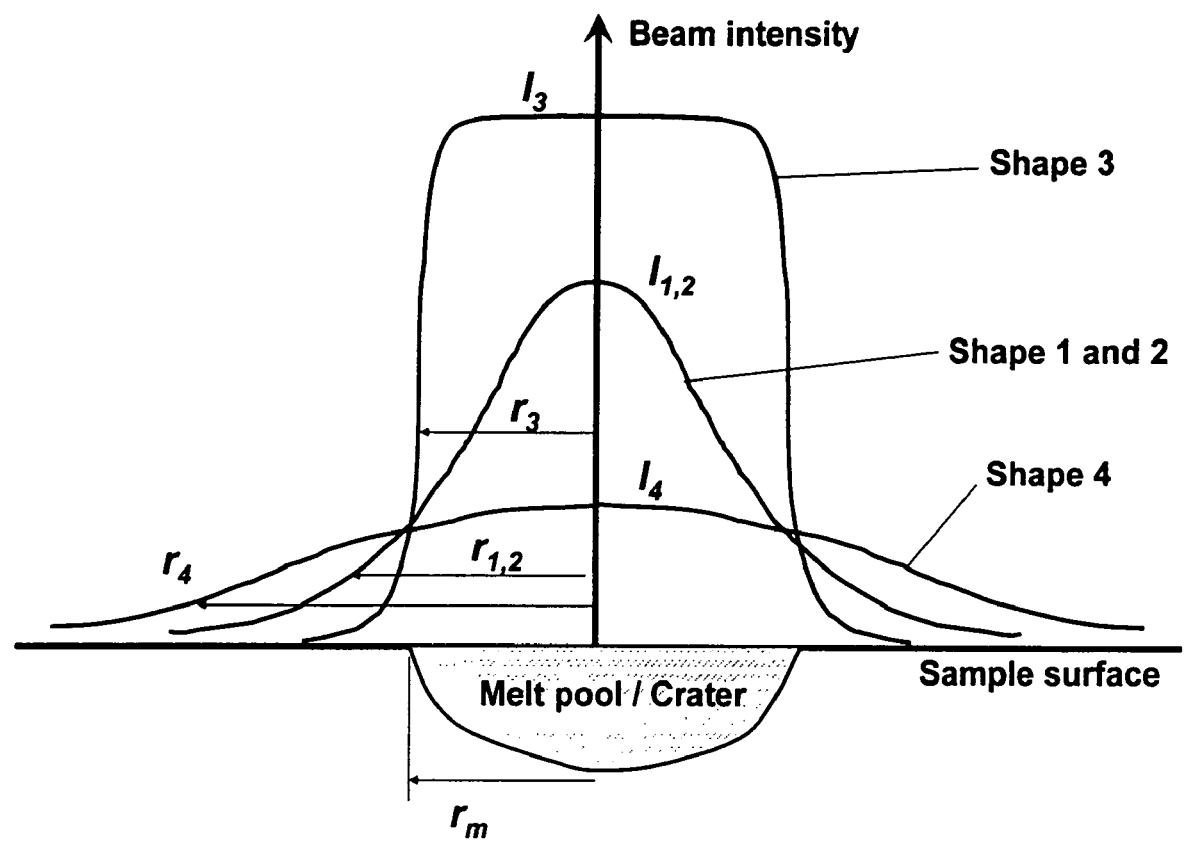
FIG. 3 is a schematic graphical view of a preferred beam intensity distribution for the semiconductor wafer and glass cutting methods in accordance with the present invention.

A preferred intensity distribution of the laser beam during the first and second parts of the laser pulse ($t_1$ and $t_2$ in FIG. 2) may be a Gaussian-like ("bell" like) distribution denoted in FIG. 3 as "Shape 1 and 2". This beam distribution has a radius at $1/e^2$ level of intensity, $r_{1,2}$, which is different (larger or smaller) than the radius of the melt pool, $r_m$. The Gaussian-like beam intensity distribution produces a melt pool with a maximum depth at the beam axis and a melt depth which is sharply decreasing near the pool edge as described above and schematically shown in FIG. 3. The maximum intensity of the beam intensity distribution during parts 1 and 2, denoted as $I_{1,2}$ in FIG. 3, is changing in time according to the change of laser power $P_1$ and $P_2$ shown in FIG. 2.

The preferred intensity distribution of the laser beam during part 3 should be near uniform distribution, frequently called "hat top" distribution, with the radius at $1/e^2$ intensity level, $r_3$, close to the melt pool radius, $r_m$, and sharply decreasing intensity for the radii exceeding a value of $r_3$ (denoted as "Shape 3" in FIG. 3). The temporal change of the maximum intensity of this part of the distribution, denoted as $I_3$ in FIG. 3, is changing in time according to the change of the laser power $P_3$ shown in FIG. 2. During part 3, the melt is expelled by evaporation recoil with high velocity at a large angle to the sample surface, determined by the inclination of the melt pool bottom near the pool periphery.

The preferred intensity distribution of the laser beam during the fourth part of the laser pulse ($t_4$ in FIG. 2) could be a Gaussian-like ("bell" like) distribution denoted in FIG. 3 as "Shape 4". This beam distribution has a radius at $1/e^2$ level of intensity, $r_4$, which is larger than the radius of the melt pool/crater, $r_m$. The temporal change of the maximum intensity of this part of the distribution, denoted as $I_4$ in FIG. 3, is changing in time according to the change of the laser power $P_4$ shown in FIG. 2. During this fourth part of the laser pulse, the crater bottom, crater side walls, and the sample surface near the crater edge outside of the crater, are exposed to the laser beam with decreasing power, which provides a gradual and controlled decrease of the material temperature, preventing thermal cracking.

The present invention can be implemented using commercially available lasers. For example, drilling of a silicon sample can be performed using a laser pulse having the following parameters:

1) the energy in the first portion of the pulse is $E_1$=1 Joule (J), the duration is $t_1$=0.001 s (i.e. power during the first portion of the pulse is $P_1$=1000 Watts (W));
2) the energy in the second portion of the pulse is $E_2$=0.125 J, the duration is $t_2$=0.0005 s (i.e. power during the second portion of the pulse is $P_2$=250 W);
3) the energy in the third portion of the pulse is $E_3$=1.5 J, the duration is $t_3$=0.0001 s (i.e. power is $P_3$=15000 W);
4) the energy in the fourth part of the pulse is $E_4$=0.1 J, the duration is $t_4$=0.002 s.

Figure 4:
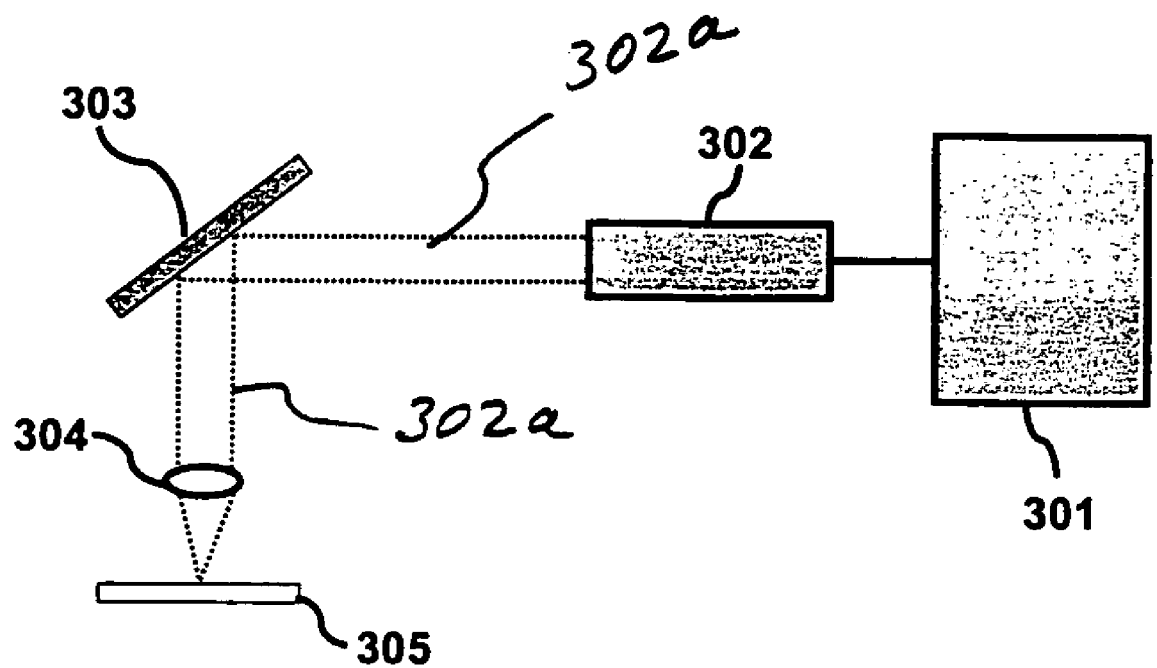
FIG. 4 is a schematic view of a preferred apparatus for the implementation of the inventive method for laser cutting of semiconductor wafers and glass.
Figure 4:
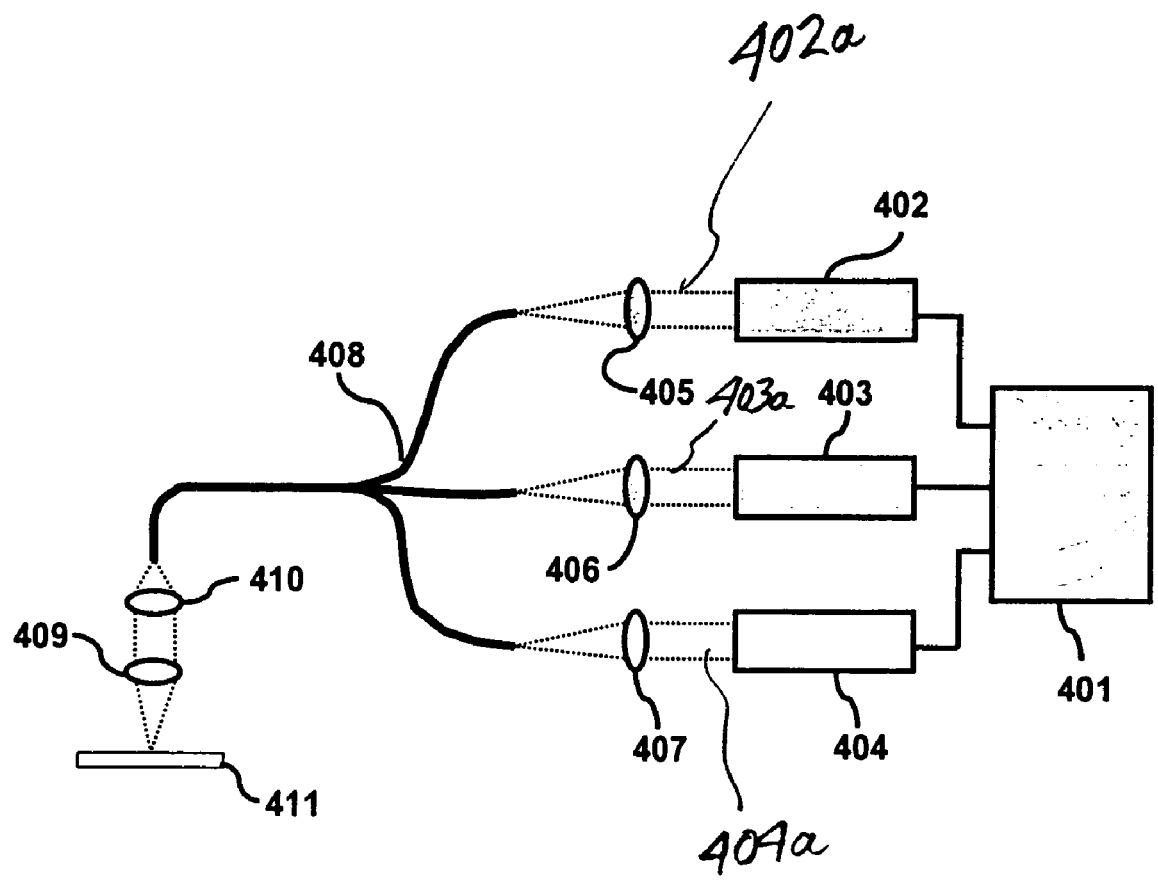

The preferred embodiment of the apparatus for the implementation of the inventive laser cutting method is schematically shown in FIG. 4a. A pulse generator 301 controls a laser system 302, which is capable of generating a laser pulse with a temporal profile as shown in FIG. 2, and with the spatial profiles shown in FIG. 3 and corresponding to the different temporal parts of the pulse. This laser system can contain two or more active media with a common resonator or separate resonators. The laser beam 302a is directed by one or several mirrors 303 to a focusing lens 304. The lens 304 focuses the laser beam 302a onto a surface of a sample or substrate positioned on a translation stage 305.

An alternative preferred apparatus embodiment is illustrated in FIG. 4b. In this embodiment, two or more commercially available lasers are integrated into a laser system, according to the principles of the invention. As illustrated, a multi-channel delayed pulse generator 401 triggers pulsing of three lasers 402, 403, and 404, respectively. For example, laser 402 may be a solid state laser, for example, a high power laser diode, generating a beam 402a with a wavelength in the visible—near infrared. (IR) region, and producing a laser pulse with a shape corresponding to the first and second parts of the pulse shape shown in FIG. 2 with a total duration of t1+t2 which can be in the range of 1 μs to 10 ms depending upon what depth of the melt pool is required. As noted above, the pulsing of the laser 402 is triggered by the multichannel delayed pulse generator 401. The wavelength of the laser 402 is selected in such a way that a desired pool depth is achieved during the laser pulse; i.e. a wavelength is selected taking into account the spectral dependence of the optical absorption coefficient of the semiconductor or glass material. Thus, the wavelength can be selected to penetrate material at the relatively very small depth which provides practically surface heating, or at a substantial depth providing volumetric heating. The pulse energy of the laser 402 is selected such that no melt ejection is produced during a laser pulse producing the first and the second part of the laser pulse shown in FIG. 2.

The second laser 403, shown in FIG. 4b, may be a Q-switched solid state or a gas laser generating beam with a wavelength in the Ultraviolet (UV)—IR region, and producing laser pulses with a shape corresponding to the third part of the laser pulse shown in FIG. 2 with a total duration of $t_3$ which can be from 1 picosecond (ps) to 10 ms. The pulsing of the laser 403 is triggered by the multichannel delayed pulse generator 401 with a delay relative to the pulse triggering laser 402 such that the pulse generated by the laser 403 follows the pulse generated by the laser 402, i.e. a laser pulse produced by the laser 403 starts at the end of the laser pulse produced by the laser 402 after time $t_1+t_2$. The wavelength of the laser 403 and the laser pulse energy are selected in such a way that the high surface temperature and, consequently, high evaporation recoil, is achieved during the laser pulse, ejecting the melt with a sufficiently high velocity to prevent spattering, i.e. a wavelength is selected taking into account the spectral dependence of the optical absorption coefficient of the semiconductor or glass material.

The third laser 404, illustrated in FIG. 4b, can be any solid state or gas laser generating beam with a wavelength in the UV—IR region, and producing laser pulses with a shape corresponding to the fourth part of the laser pulse shown in FIG. 2, with a total duration of $t_4$ which can be from 1 μs to 10 ms. The pulsing of the laser 404 is triggered by the multichannel delayed pulse generator 401 with the delays relative to the pulses triggering lasers 402 and 403, such that the pulse generated by the laser 404 follows the pulse generated by the laser 403, i.e. the laser pulse produced by the laser 404 starts after delay $t_1+t_2+t_3$ relative to the beginning of the laser pulse produced by the laser 402 and after delay $t_3$ relative to the beginning of the laser pulse produced by the laser 403. The wavelength and the pulse energy of the laser 404 are selected in such a way that the gradual decrease of the temperature in the volume of the material is achieved, thereby helping to minimize or entirely prevent microcracking. In particular, the wavelength of the laser 404 is selected taking into account the spectral dependence of the optical absorption coefficient of the semiconductor or glass material. Thus, the wavelength can be selected to penetrate material at the relatively very small depth providing practically surface heating, or at a substantial depth providing volumetric heating.

The multichannel delayed pulse generator 401 repetitively triggers the lasers; 402, 403, and 404 with the described delay pattern. The repetition rate of the triggering can be from several Hz to several hundred kHz, depending upon the required shape of the laser pulse (see FIG. 2).

The laser beams 402a, 403a, and 404a, respectively, generated by the lasers 402, 403, and 404, are focused by the corresponding lenses 405, 406, and 407, respectively, in order to couple the beams into three inputs of a fiber beam delivery system 408. The diameters of the beams produced by the lasers 402, 403, and 404, the focusing lengths of the lenses 405, 406, and 407, the diameters of the three inputs of the fiber delivery system 408, and a focusing head which includes lens system 409 and 410, are designed such that the spatial beam distributions illustrated in FIG. 3 are achieved at the surface of a workpiece 411. Design of the disclosed beam delivery system is possible using off the shelf optics design tools.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A method for modifying a material surface using one or more lasers, comprising:

applying a laser pulse to a desired laser beam interaction zone on said material surface for a predetermined period $t_1$ at a predetermined power level $P_1$ such that processed material melts and evaporates, producing evaporation induced recoil which displaces produced melt to a periphery of the interaction zone without substantial ejection of molten material from said laser beam interaction zone, thereby creating a keyhole in the material;

applying a laser pulse to said laser beam interaction zone for a predetermined period $t_2$ at a different predetermined power level $P_2$ such that the induced evaporation recoil is insufficient to counteract surface tension pressure and a controlled collapse of said keyhole occurs while maintaining a temperature of produced melt above a melting temperature of said material;

applying a laser pulse to said laser beam interaction zone for a predetermined period $t_3$ at a predetermined power level $P_3$ that is different from power levels $P_1$ and $P_2$ such that rapid evaporation of the molten material is induced, generating recoil which produces near complete ejection of the melt created during the first period $t_1$, and thus forming a crater; and applying a laser pulse to said laser beam interaction zone for a predetermined period $t_4$ at a predetermined power level $P_4$ that is different from power levels $P_1$, $P_2$, and $P_3$ such that a temperature of the remaining melt which was not ejected from the interaction zone and a temperature of the solid material near a wall of said crater decreasing at a controlled rate which is below a cooling rate which would ordinarily produced microcracking of said material.

2. The method as recited in claim 1, wherein $t_1$ is longer than $t_2$.

3. The method as recited in claim 1, wherein $P_2$ is lower than $P_1$.

4. The method as recited in claim 1, wherein P3 is higher than any of $P_1$, $P_2$, or $P_4$.

5. The method as recited in claim 1, wherein $P_4$ is lower than any of $P_1$, $P_2$, or $P_3$ and gradually declines to substantially zero.

6. The method as recited in claim 1, wherein two or more of said laser pulses each comprise a different part of one single laser pulse.

7. The method as recited in claim 1, wherein said laser pulses are repeated, in sequence.

8. The method as recited in claim 1, wherein said material comprises a semiconductor material.

9. The method as recited in claim 1, wherein said material comprises lass.

* * * * *